(12) United States Patent
Hildreth

(10) Patent No.: US 8,373,657 B2
(45) Date of Patent: Feb. 12, 2013

(54) ENHANCED MULTI-TOUCH DETECTION

(75) Inventor: Evan Hildreth, Ottawa (CA)

(73) Assignee: Qualcomm Incorporated, San Diego, CA (US)

( * ) Notice: Subject to any disclaimer, the term of this patent is extended or adjusted under 35 U.S.C. 154(b) by 619 days.

(21) Appl. No.: 12/540,992

(22) Filed: Aug. 13, 2009

(65) Prior Publication Data

US 2010/0039379 A1 Feb. 18, 2010

Related U.S. Application Data

(60) Provisional application No. 61/089,125, filed on Aug. 15, 2008.

(51) Int. Cl.
*G09G 5/08* (2006.01)
*G06F 3/033* (2006.01)

(52) U.S. Cl. .................... 345/158; 345/156; 345/173

(58) Field of Classification Search .......... 345/156–173
See application file for complete search history.

(56) References Cited

U.S. PATENT DOCUMENTS

| | | | |
|---|---|---|---|
| 6,031,519 A * | 2/2000 | O'Brien | 345/156 |
| 7,488,965 B2 * | 2/2009 | Cochran et al. | 250/559.45 |
| 7,670,006 B2 * | 3/2010 | Lieberman | 353/70 |
| 2002/0075240 A1 * | 6/2002 | Lieberman et al. | 345/170 |
| 2004/0102247 A1 * | 5/2004 | Smoot et al. | 463/36 |
| 2004/0108990 A1 * | 6/2004 | Lieberman et al. | 345/156 |
| 2004/0201575 A1 * | 10/2004 | Morrison | 345/173 |
| 2005/0168448 A1 * | 8/2005 | Simpson | 345/173 |

OTHER PUBLICATIONS

International Search Report & Written Opinion issued in International Application No. PCT/US09/53754, mailed Sep. 21, 2009, 10 pages.

* cited by examiner

*Primary Examiner* — Viet Pham
(74) *Attorney, Agent, or Firm* — Kilpatrick Townsend & Stockton LLP

(57) ABSTRACT

Enhanced multi-touch detection, in which a graphical user interface for an application is projected onto a surface, and electromagnetic radiation is emitted. The electromagnetic radiation is collectively emitted by an array defining a layer aligned parallel with the surface and overlapping at least a region of the surface onto which the graphical user interface is projected. Electromagnetic radiation is detected that reflects off of an object interrupting the defined layer where the defined layer overlaps the region of the surface onto which the graphical user interface is projected, and indicating a position of the object is output.

26 Claims, 14 Drawing Sheets

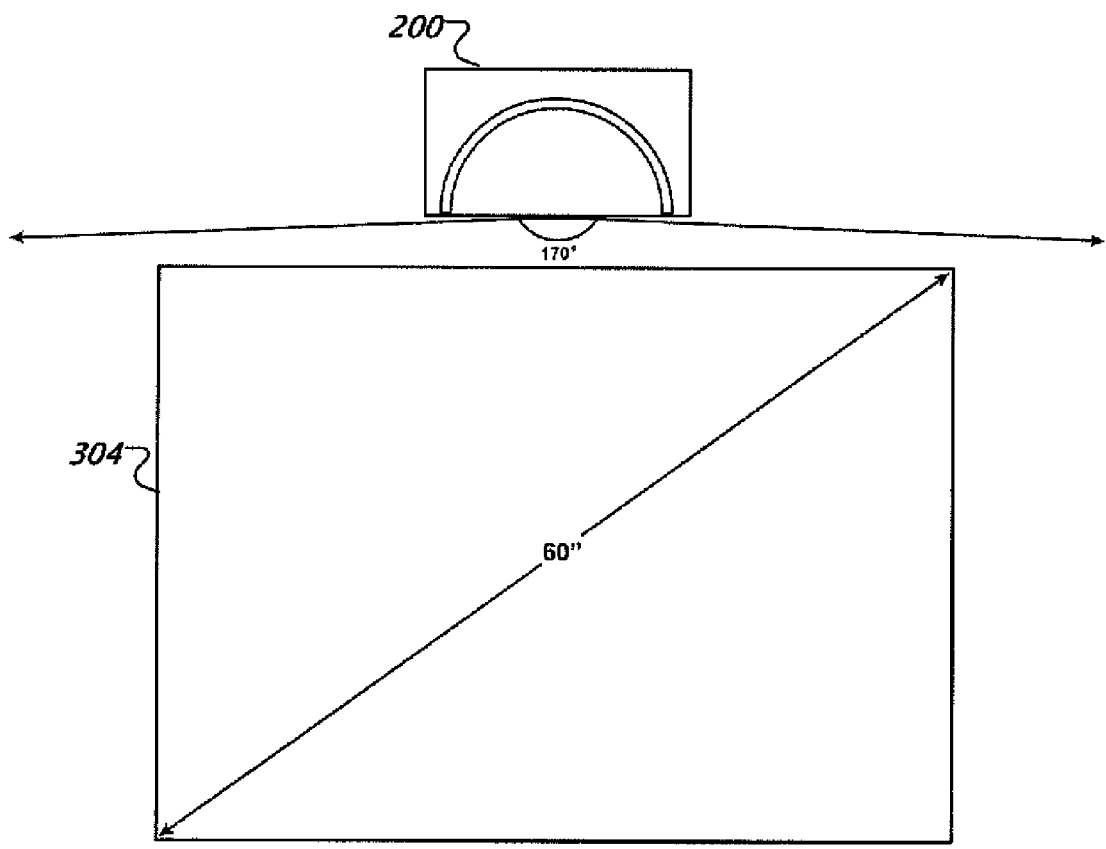
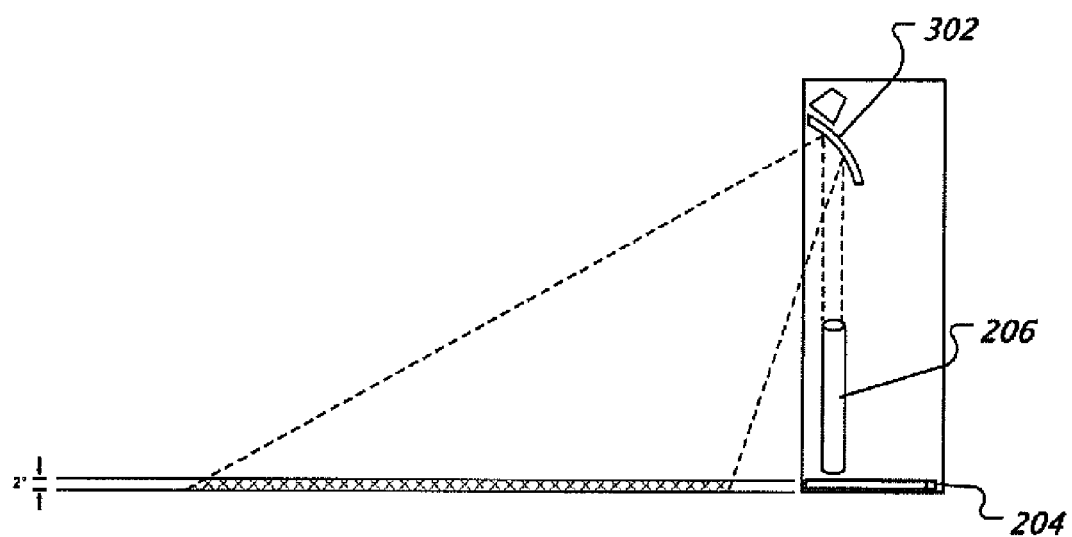
FIG.3

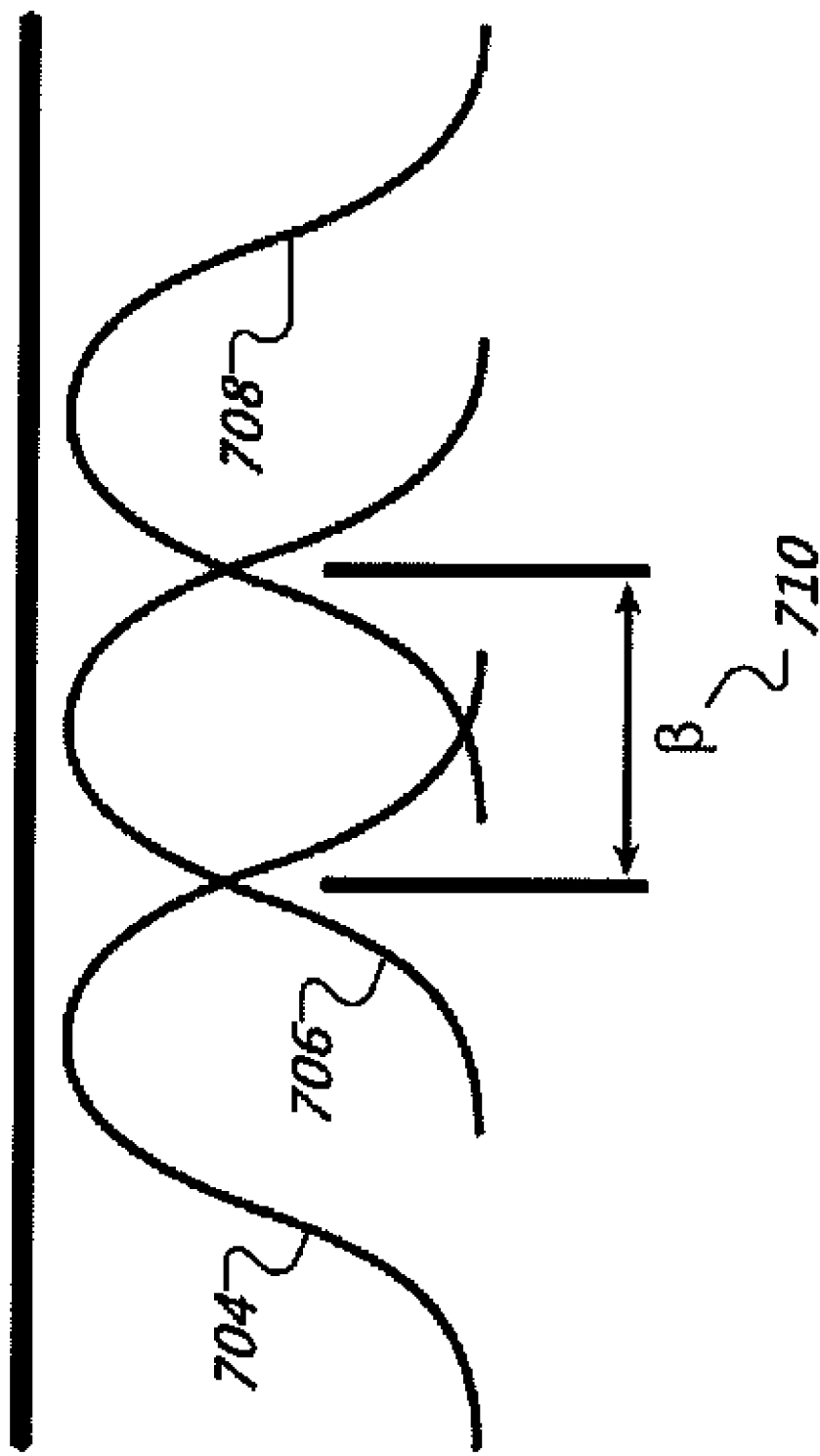

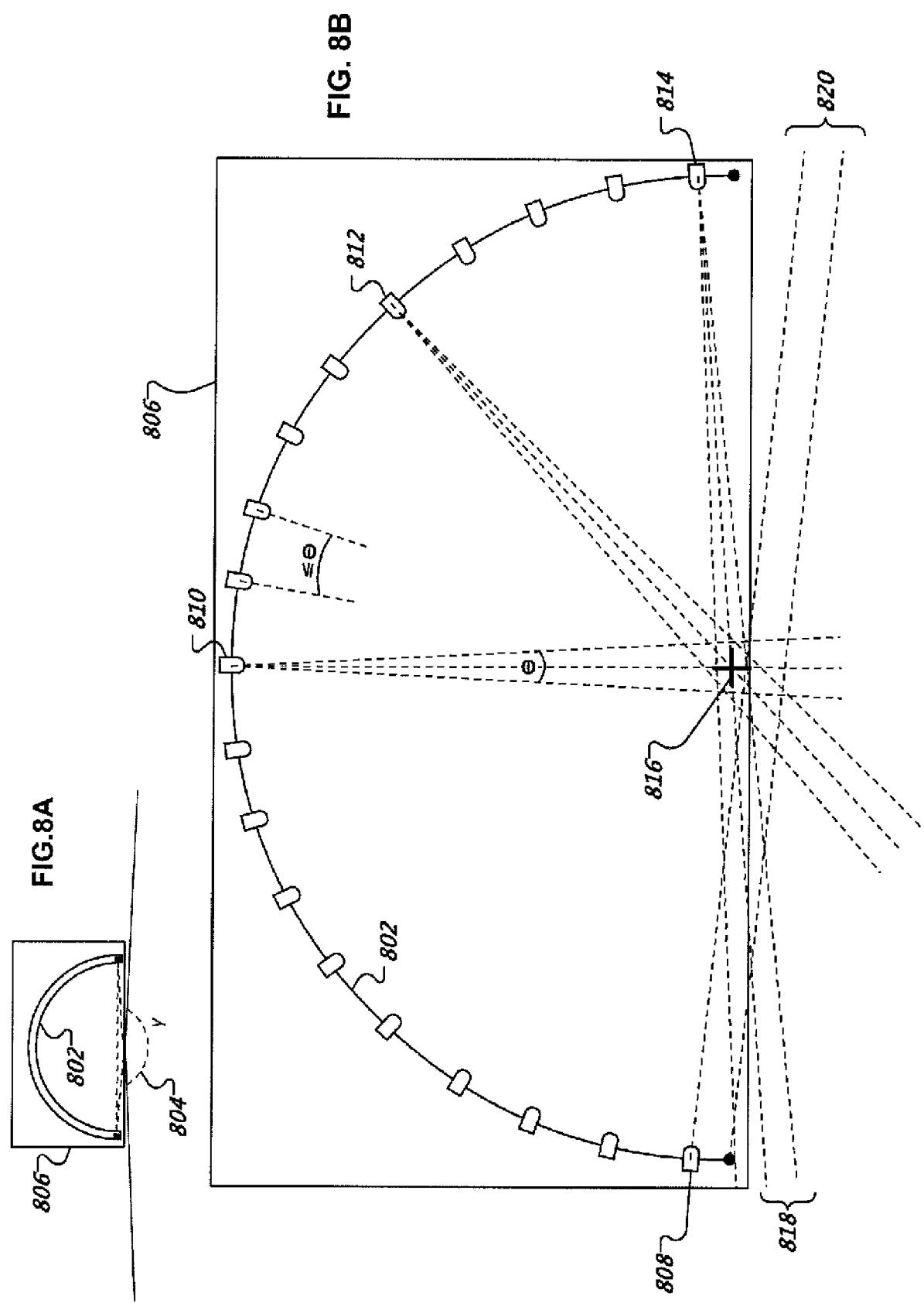

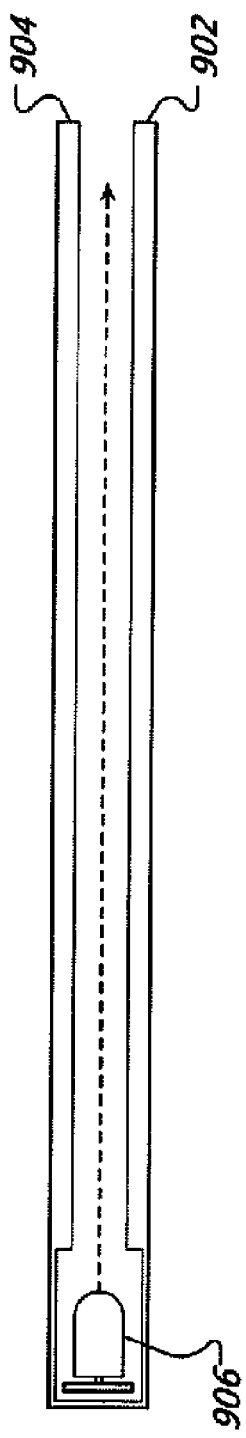
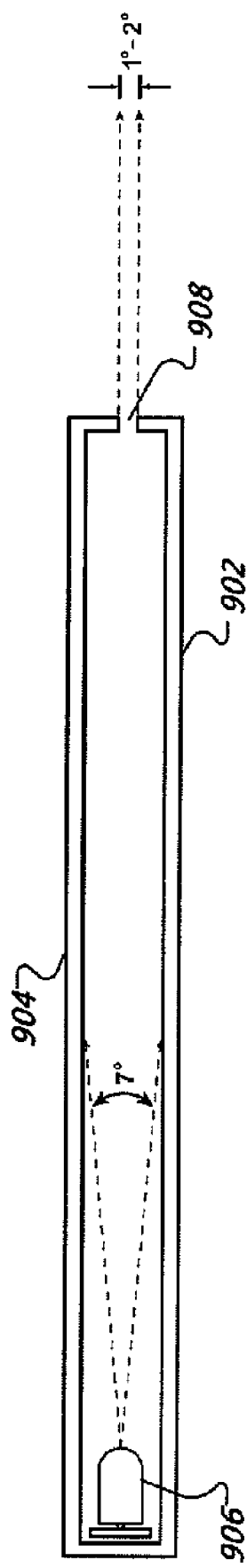
FIG.9A
FIG.9B

ENHANCED MULTI-TOUCH DETECTION

CROSS REFERENCE TO RELATED APPLICATIONS

This application claims the benefit of U.S. Provisional Patent Application No. 61/089,125, filed Aug. 15, 2008, which is incorporated herein by reference in its entirety.

FIELD

The present disclosure generally relates to user input.

BACKGROUND

Cameras have been used to capture images of objects. Techniques have been developed to analyze one or more images of an object present within the one or more images to detect a position of the object. For example, optical flow has been used to detect motion of an object by analyzing multiple images of the object taken successively in time. Projectors have been used to project still or moving images onto a surface.

SUMMARY

According to one general implementation, a portable device includes a projector (such as a short throw or an ultra short throw projector) which projects a sequence of images which make up a user interface of an application onto a surface, such as the surface upon which the portable device rests. The images may be of, for example, animated objects which exist within a virtual world or environment. Although the surface itself may be a basic floor or table surface which lacks specialized electronic components or equipment, the images projected on the surface define a virtual desktop which a user may interact with by "touching" any point thereon with their hand, finger, foot or other control object.

Infrared emitters disposed near the bottom of the portable device emit a wide-angle plane of flashing or non-flashing light parallel to, and overlapping, the virtual desktop projected on the surface. When a user interacts with the user interface by touching the surface or hovering over the surface with the control object, the plane of light is broken by the control object, and a camera mounted on the device detects infrared light reflected off of the control object. Based upon the position of the reflected infrared light within the camera image, the position of the control object relative to the device can be determined and mapped as a control input to the application. Where the images include the animated objects which exist within the virtual world or environment, for example, a user's touch on or near the surface may be mapped to an "interaction" between the real-world user and the virtual objects.

According to another general implementation, a device includes a projector configured to project a graphical user interface for an application onto a surface, and an array of emitters each configured to emit electromagnetic radiation, the electromagnetic radiation collectively emitted by the array defining a layer aligned parallel with the surface and overlapping at least a region of the surface onto which the graphical user interface is projected. The device also includes a sensor configured to detect the electromagnetic radiation that reflects off of an object interrupting the defined layer where the defined layer overlaps the region of the surface onto which the graphical user interface is projected, and an interface configured to output data indicating a position of the object.

Implementations may include one or more of the following features. For example, the array may be a semicircular array configured to emit electromagnetic radiation toward a central point of the array of emitters, and the projector may be a short throw or an ultra short throw projector. The device may further include a housing, where the projector, the array, and the sensor are disposed within the housing. The projector may be configured to project the graphical user interface onto the surface through the defined layer of electromagnetic radiation. The array of emitters may include emitter facets each including multiple emitters. A difference in angle between adjacent emitters of the array may be less than or equal to a minimum angle of half intensity of each of the adjacent emitters. The array of emitters may further include first and second stacked arrays of emitters. The array of emitters may further include a plate defining a slot, the slot limiting a vertical spread of the electromagnetic radiation collectively emitted by the array.

In other examples, the device also includes a processor configured to determine the position of the object with respect to the region of the surface onto which the graphical user interface is projected, based on the detected electromagnetic radiation, and to control the application based on the determined position. The position of the object may be determined with respect to the region of the surface onto which the graphical user interface is projected based on applying a coordinate transform to the detected electromagnetic radiation. The processor may be further configured to automatically calibrate the projector and the sensor. The sensor may also include a wide-angle lens, and the processor may also be configured to correct a distortion associated with the wide-angle lens. Controlling the application based on the determined position may further include mapping the determined position to a mouse event. The array may be disposed between the projector and the surface. The region may include a rectangular region measuring at least 60 inches diagonal, the array may emit the electromagnetic radiation at a horizontal angle of 170° or greater, and a vertical angle of 1° or less.

According to another general implementation, a computer-implemented process includes projecting a graphical user interface for an application onto a surface, and emitting electromagnetic radiation, the electromagnetic radiation collectively emitted by an array defining a layer aligned parallel with the surface and overlapping at least a region of the surface onto which the graphical user interface is projected. The process also includes detecting the electromagnetic radiation that reflects off of an object interrupting the defined layer where the defined layer overlaps the region of the surface onto which the graphical user interface is projected, and outputting data indicating a position of the object.

In various exemplary implementations, the process may include determining the position of the object with respect to the region of the surface onto which the graphical user interface is projected, based on the detected electromagnetic radiation, and controlling the application based on the determined position. The process may also include applying a coordinate transform to the detected electromagnetic radiation.

According to another general implementation, a computer-readable medium encoded with a computer program includes instructions that, when executed, operate to cause one or more computers to perform operations that include projecting a graphical user interface for an application onto a surface, and emitting electromagnetic radiation, the electromagnetic radiation collectively emitted by an array defining a layer aligned parallel with the surface and overlapping at least a region of the surface onto which the graphical user interface is projected. The operations also include detecting the electromagnetic radiation that reflects off of an object interrupting the defined layer where the defined layer overlaps the region of the surface onto which the graphical user interface is projected, and outputting data indicating a position of the object.

In various exemplary implementations, the operations further comprise projecting the graphical user interface onto the surface through the defined layer of electromagnetic radiation. The operations may further include determining the position of the object with respect to the region of the surface onto which the graphical user interface is projected, based on the detected electromagnetic radiation, and controlling the application based on the determined position.

Implementations of any of the techniques described above may include a method, a process, a system, a device, an apparatus, an interaction interface, instructions stored on a computer-readable medium, or a computer-readable medium encoded with a computer program. The details of one or more implementations are set forth in the accompanying drawings and the description below. Other features will be apparent from the description and drawings, and from the claims.

BRIEF DESCRIPTION OF THE DRAWINGS

FIG. 3 illustrates top and side views of a device.
FIGS. 6-8 illustrate emitter placement and spacing.
FIG. 9 illustrates various exemplary approaches for restricting emission.

DETAILED DESCRIPTION

According to one general implementation, a portable device includes an ultra short throw projector which projects a sequence of images which make up a user interface of an application onto a surface, such as the surface upon which the portable device rests. The images may be of, for example, animated objects which exist within a virtual world or environment. Although the surface itself may be a basic floor or table surface which lacks specialized electronic components or equipment, the images projected on the surface define a virtual desktop which a user may interact with by "touching" any point thereon with their hand, finger, foot or other control object.

Infrared emitters disposed near the bottom of the portable device emit a wide-angle plane of flashing or non-flashing infrared light parallel to, and overlapping, the virtual desktop projected on the surface. When a user interacts with the user interface by touching the surface or hovering over the surface with the control object, the plane of infrared light is broken by the control object, and a camera mounted on the device detects infrared light reflected off of the control object. Based upon the position of the reflected infrared light within the camera image, the position of the control object relative to the device can be determined and mapped as a control input to the application. Where the images include the animated objects which exist within the virtual world or environment, for example, a user's touch on or near the surface may be mapped to an "interaction" between the real-world user and the virtual objects.

Figure 1:
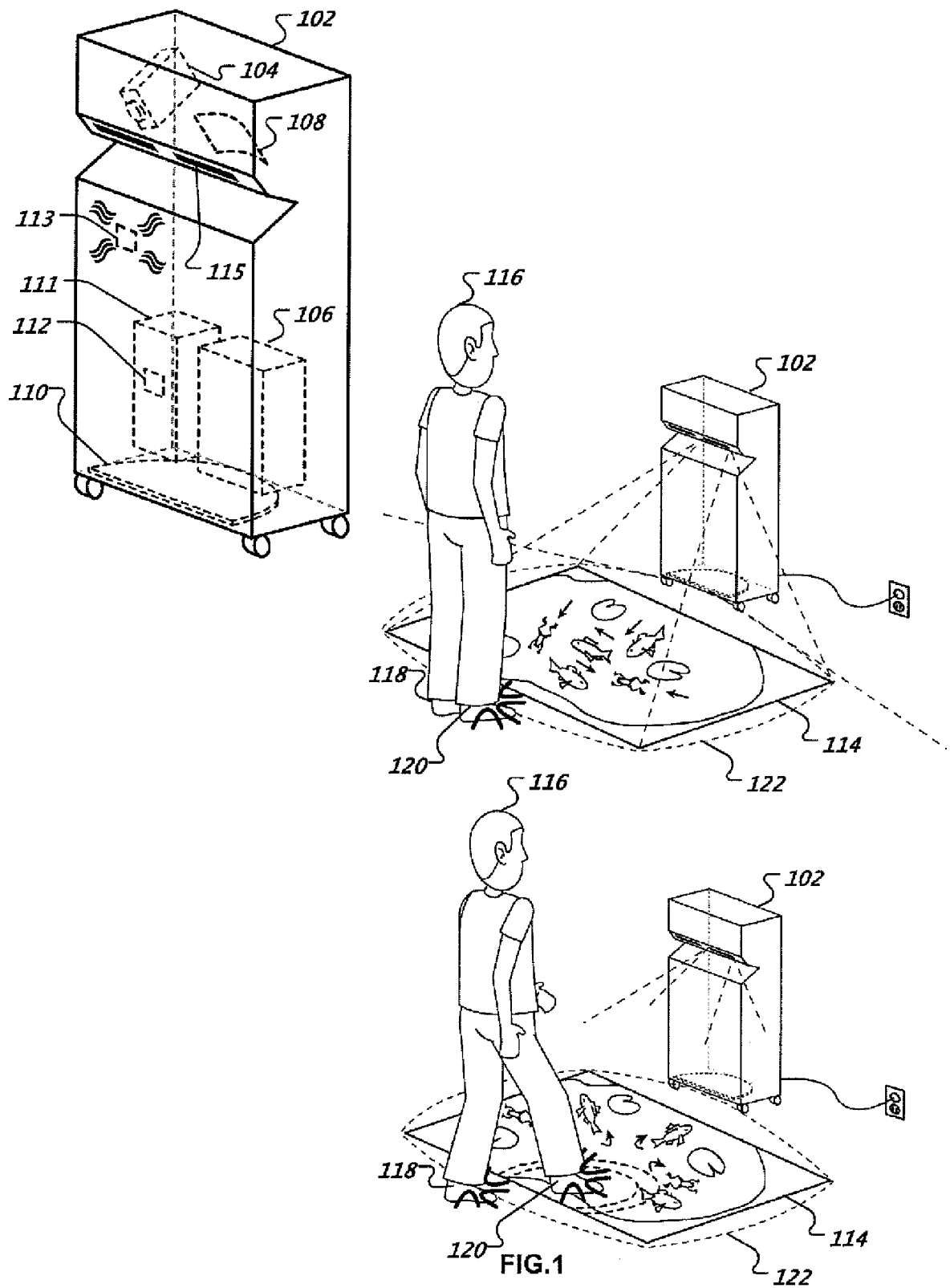
FIG. 1 illustrates a contextual diagram demonstrating object detection and concomitant application control.

FIG. 1 is a contextual diagram demonstrating object detection and concomitant application control. A device 102 includes a camera 104, a projector 106, a mirror 108, a semicircular array of emitters 110, and a computing device 111. The computing device 111 may include a processor 112. In some implementations, the computing device 111 may be included in the housing of the device 102 (as shown in FIG. 1), and in other implementations, the device 102 may interface with an external processor (e.g., through one or more wired or wireless connections, such as a USB (Universal Serial Bus) interface). The semicircular array of emitters 110 may include flashing or non-flashing Light Emitting Diodes (LEDs). The projector 106 may be a short throw or ultra short throw projector, and the mirror 108 may be an aspheric mirror.

In some implementations, the device 112 includes an interface 113. The interface 113 may be an external interface, such as the USB interface or a BLUETOOTH® interface, and may be used for broadcasting raw sensor data, determined coordinates of one or more detected objects and/or other information. In other implementations, the interface 113 may be an internal interface, which may be used, for example, for passing raw image data from the camera 104 to the computing device 111 for computation of the position of one or more detected objects.

The projector 106 may project an image or sequence of images onto the mirror 108. The projected image reflects off of the mirror 108, through a slot 115, and is spread out onto a surface (e.g., the floor or table upon which the device 102 sits, or an adjacent wall). The projected image may be a graphical user interface of an application which defines a virtual desktop upon the surface. For example, a graphical user interface 114 displaying a koi pond animation is projected onto a floor surface.

A user 116 is standing next to the graphical user interface 114. The semicircular array of emitters 110 collectively emit a wide-angle layer of electromagnetic radiation parallel to the floor, overlapping the region of the floor onto which the graphical user interface 114 is projected (e.g. the virtual desktop). The emitted layer of electromagnetic radiation reflects off of left and right ankles 118-120 of the user 116.

In some implementations, the emitted layer of electromagnetic radiation may reflect off of portions of the left and right feet of the user 116. In these implementations, the layer of electromagnetic radiation is below (e.g., closer to the surface than) the ankles 118-120 of the user 114. The layer of electromagnetic radiation parallel to the surface may be defined to be spaced below the height that a typical user raises a foot when walking. For example, the array of emitters 110 may be positioned to produce a layer of electromagnetic radiation parallel to the surface that is as close to the surface as possible to produce more of a "touch" feel for the user 114. In this example, the layer of electromagnetic radiation parallel to the surface may be defined to be spaced apart from the surface a sufficient distance to avoid dirt or bumps on the floor from blocking the electromagnetic radiation. In addition, the layer of electromagnetic radiation parallel to the surface may be defined to be spaced apart from the surface a sufficient distance to avoid contacting a near bottom portion of shoes of the user 114 because the bottom rubber on some shoes reflect electromagnetic radiation (e.g., infrared light) poorly.

In some examples, the emitted layer of electromagnetic radiation has a thickness of no more than 0.5 inches in a center of the interactive area, and no more than 1.0 inch at the furthest corners of the interactive area. In these examples, a layer of electromagnetic radiation collectively emitted by a array fans out from a central point and has a thickness of less than 0.5 inches in a center of a region of a surface onto which a graphical user interface is projected, and has a thickness of less than 1 inch in any part of the region of the surface onto which the graphical user interface is projected. The layer of electromagnetic radiation collectively emitted by the array may have a thickness of less than 1 inch throughout the entire region of the surface onto which the graphical user interface is projected.

The camera 104 captures images of the floor covered by the projected image. For example, a field of view 122 of the camera 104 includes the rectangular graphical user interface 114. The camera 104 may detect objects (e.g., hands, fingers, feet, pointing devices) which appear within an intersection of the field of view 122 and the emitted electromagnetic radiation. For example, if the user 116 steps onto the graphical user interface 114 (i.e., steps onto the region of the floor onto which the graphical user interface 114 is projected), the camera 104 may detect electromagnetic radiation reflecting off of the right ankle 120. A mask may prevent the camera 104 from detecting electromagnetic radiation detected outside of the boundaries of the projected image.

The processor 112 may detect the position of the right foot 120 and in response may control the application displayed in the graphical user interface 114. For example, the animated fish displayed in the koi pond animation may appear to "swim away" from the user's foot. As another example, the animation may be changed to include a simulation of circular water ripples emanating away from the user's foot. In addition to entertainment uses with human users, the device 102 may also be used for therapeutic uses, such as a physical therapy device, or with animals, for example to entertain pets.

Figure 2:
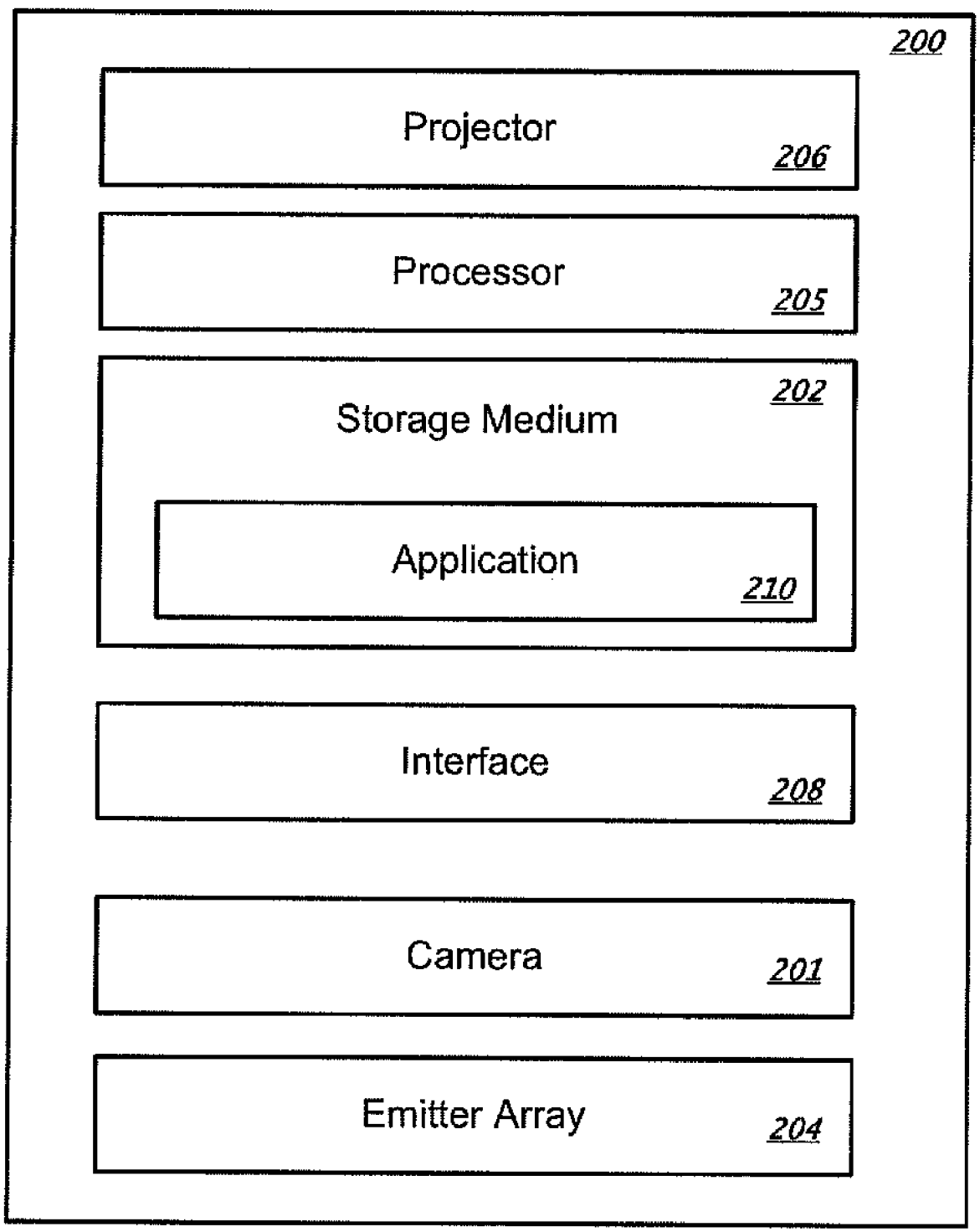
FIG. 2 is a block diagram of a device.

FIG. 2 is a block diagram of a device 200. Briefly and among other things, the device 200 includes a camera 201, a storage medium 202, an emitter array 204, a processor 205, a projector 206, and an interface 208. The storage medium 202 stores and records information or data, and may be an optical storage medium, magnetic storage medium, flash memory, or any other storage medium type. Among other things, the storage medium is encoded with an application 210 which generates an image or images which make up a user interface. The application 210 may be, for example, an advertising application, a gaming application, a media hub application, a medical therapy application, or any other type of application.

The camera 201 is a device used to capture images. The camera 201 may use the light of the visible spectrum or with other portions of the electromagnetic spectrum, such as infrared. For example, the camera 201 may be a digital camera, a digital video camera, or any other type of device configured to capture images. The camera 201 may include one or more cameras. At various times during the operation of the device, the camera 201 may detect different portions of the electromagnetic spectrum. For instance, in a calibration state, the camera may detect a grid of visible light points projected by the projector 206 and, in an operational state, the camera may detect infrared light points emitted by the emitter array 204.

The camera 201 may be a stereo camera, a time-of-flight camera, or any other type of image sensor. The camera 201 may produce a grayscale image, color image, or a distance image, such as a stereo camera or time-of-flight camera capable of generating a distance image. A stereo camera may include two image sensors that acquire images at slightly different viewpoints, where a processor compares the images acquired from different viewpoints to calculate the distance of parts of the images. A time-of-flight camera may include an emitter that generates a pulse of light, which may be infrared light, where the time the pulse of light travels from the emitter to an object and back to a sensor is measured to calculate the distance of parts of the images.

The device 200 is electrically connected to and in operable communication with, over a wireline or wireless pathway, the camera 201 and the projector 206, and is configured to control the operation of the processor 205. In one configuration, the device 200 uses the processor 205 or other control circuitry to execute an application that provides for enhanced camera-based input. Although the camera 201 may be a separate unit (such as a webcam) that communicates with the device 200, in other implementations the camera 201 is built into the device 200, and communicates with other components of the device 200 (such as the processor 205) via an internal bus.

In one configuration, emitters in the emitter array 204 flash in synchronization with the projector 206 such that the emitter produces light at times when the projector 206 does not produce light at that wavelength. For example, the emitters may emit light during a time when the projector 206 produces no light. Alternatively, where a DLP projector is used that produces red, green, and blue images sequentially, the emitter array 204 may produce red light during the time that the projector 206 is projecting green and blue images, for example. The camera 201 may have a filter to only detect the emitted light's wavelength and may be synchronized to detect that wavelength when the emitter array 204 is producing it (i.e., when the projector 206 is not producing light having that wavelength). In a calibration state, the camera 201 may be synchronized to detect the projector's light.

In another configuration, polarized light may be used, where an angle of polarization differentiates the projected light from the emitter's light, and the camera 201 may include a polarized filter so that only the emitter's light is detected. In another configuration, the projector 206 may produce specific visible wavelengths of light (such as an LED DLP projector, which produces red, green and blue light, each at a specific wavelength), and the emitter array 204 may produce a different, specific visible wavelength of light (such as amber). In this example, the projector 206 may reproduce the appearance of amber light as a combination of red and green wavelengths of light while projecting no light of the actual amber wavelength. The camera 201 may include a band-pass filter for detecting only amber wavelengths of light.

In one configuration, the emitter array 204 may produce infrared light, while the projector 206 does not emit infrared light. The camera 201 may include a long-pass filter for detecting only infrared wavelengths of light. For example, the long-pass filter may filter out light that is not in the infrared range and the camera 201 may capture images of light that has passed through the long-pass filter. The emitter array may produce infrared light having a wavelength of (or near) 850 nm, and the camera's long-pass filter may have a cut-off at 780 nm.

The interface 208 may be an external interface, such as a USB or BLUETOOTH® interface, and may be used for broadcasting coordinates of one or more detected objects and/or other information to one or more external devices. In other implementations, the interface 208 may be an internal interface, which may be used, for example, for passing raw image data from the camera 201 to the processor 205 for computation of the position of one or more detected objects.

As shown in FIG. 3, the projector 206 may be a short throw projector capable of projecting an image very near (e.g., six inches) to the device 200. The projector may project an image onto a mirror (e.g., mirror 302), and the image may be reflected off of the mirror and spread out onto a surface (e.g., floor, table). The projected image may be projected on the surface in a rectangular region 304 measuring at least 60 inches diagonal. The projector 206 may be an LCD (Liquid Crystal Display) or DLP (Digital Light Processing) projector.

The emitter array 204 may be a semicircular array of individual emitters or a semicircular array of facets where each facet includes a set of emitters. Emitters may be LED emitters. Emitters may be spaced so that the distance between adjacent emitters is less than an angle of half intensity of the emitters. As shown in FIG. 3, the emitter array 204 may be disposed between the projector 206 and the surface. The emitter array 204 may emit electromagnetic radiation at a horizontal angle of 170° or greater, and vertical angle of 1° or less (or vice versa). The array may also take on any two- or three-dimensional shape, such as linear, or polygonal, circular, letter-shaped (e.g. U-shaped, V-shaped, W-shaped, L-shaped, etc.), or any other shape.

The projected image may be a graphical user interface of the application 210. The camera 201 may detect reflected electromagnetic radiation that reflects off an object (e.g., user's hand or foot, pointing device) which interrupts a layer of electromagnetic radiation overlapping a region of the surface onto which the graphical user interface is projected. The position of the detected object may be determined from the camera image and the processor 205 may control the application 210 based on the detected position of the object.

Although the device 200 has been described as including or interfacing with a personal computer (PC) or set top box, such a description is made merely for the sake of brevity, and other implementations or manifestations are also contemplated. For instance, the device 200 may be implemented using a television, an ultra-mobile personal computer (UMPC), a mobile internet device (MID), a digital picture frame (DPF), a portable media player (PMP), a general-purpose computer (e.g., a desktop computer, a workstation, or a laptop computer), a server, a gaming device or console, or any other type of electronic device that includes a processor or other control circuitry configured to execute instructions, or any other apparatus that includes a user interface.

Figure 4:
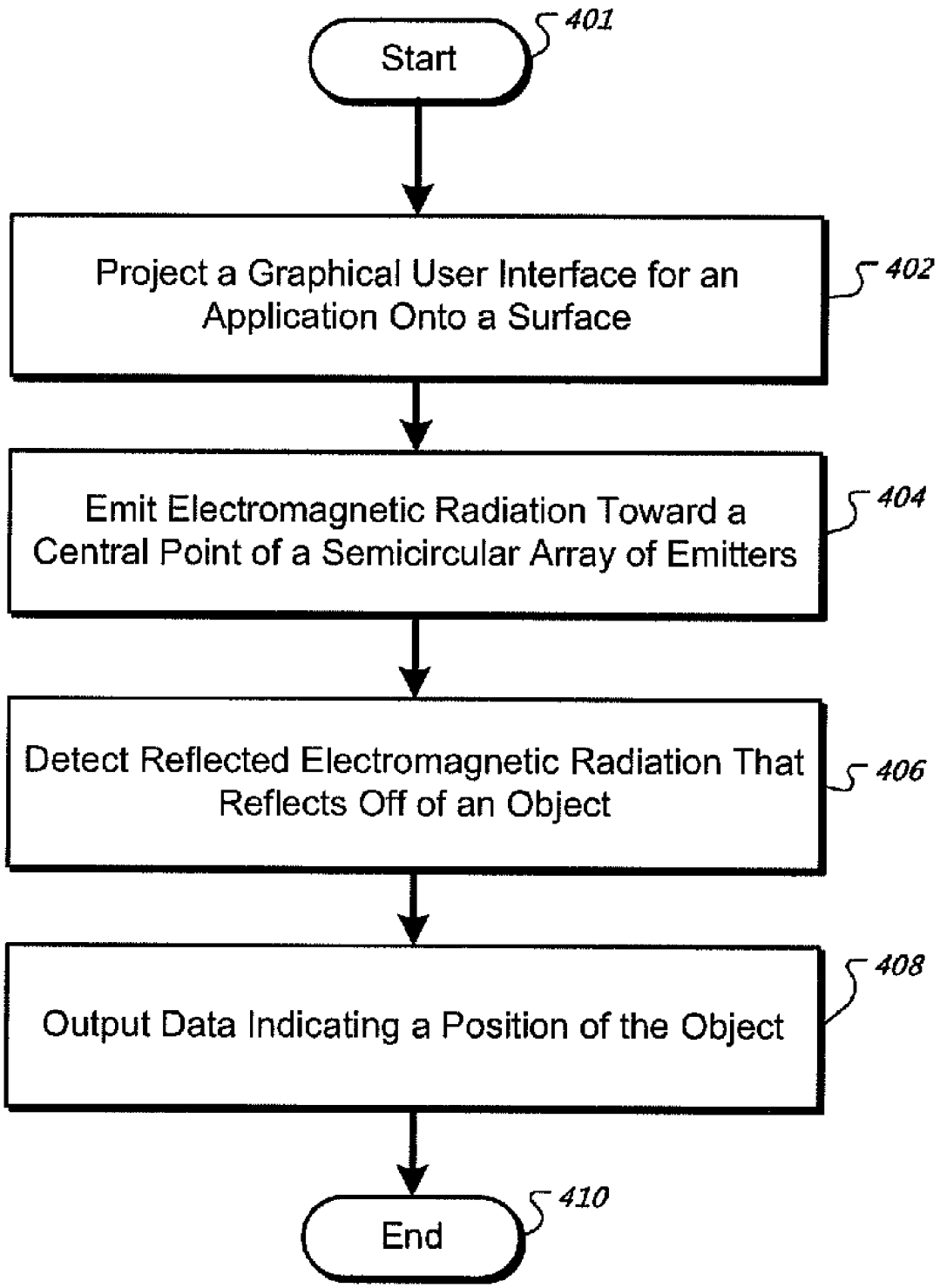
FIG. 4 is a flowchart of an exemplary process.

FIG. 4 is a flowchart illustrating a computer-implemented process 400 that effects application functionality in response to positions of detected objects. Briefly, the computer-implemented process 400 includes projecting a graphical user interface for an application onto a surface, emitting electromagnetic radiation, detecting reflected electromagnetic radiation that reflects off of an object, and outputting data indicating a position of the object. If the array is semicircular, the array may be configured to emit the electromagnetic radiation toward a central point on the array.

In further detail, when the process 400 begins (S401), a graphical user interface for an application is projected onto a surface (S402). The surface may be, for example, a floor or table. The graphical user interface may include, for example, user interface controls. As another example, the graphical user interface may be a graphical animation.

When the graphical user interface is projected, electromagnetic radiation is emitted (S404), where the electromagnetic radiation is collectively emitted by an array in a manner that defines a layer aligned parallel with the surface and overlaps at least a region of the surface onto which the graphical user interface is projected. The array may be configured to emit the electromagnetic radiation toward a central point on the array. The central point may be defined at the center of a semicircular array, or some point ahead of, behind, above, below, or to the left or right of the actual or exact center.

Figure 5B:
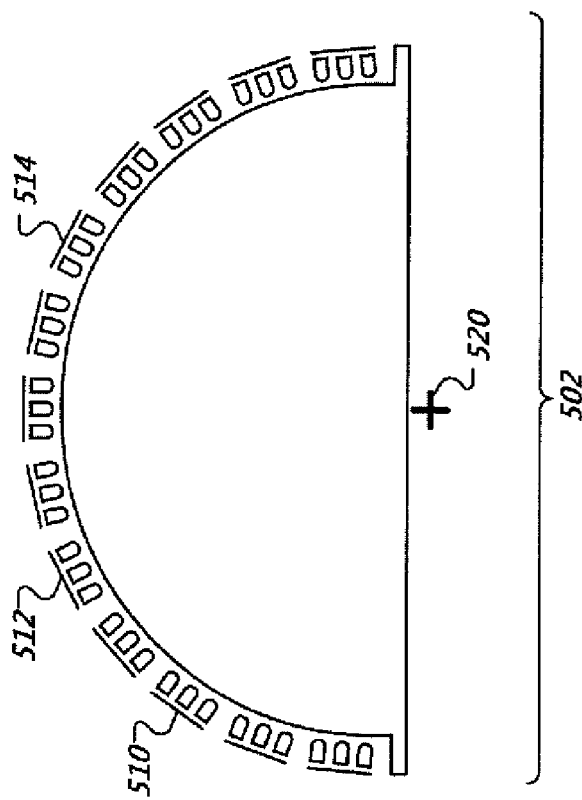
FIG. 5 illustrates exemplary arrays of emitters.
Figure 5A:
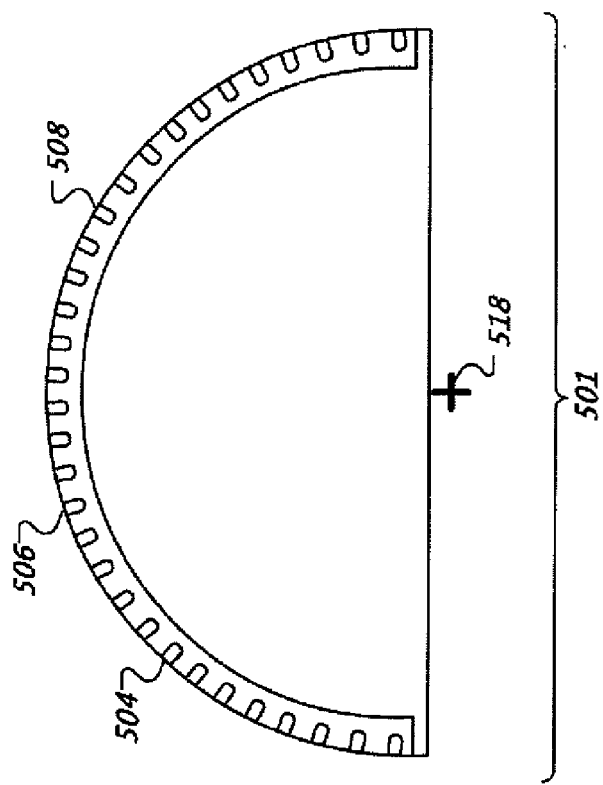

A semicircular array of emitters may be constructed by mounting individual emitters in a semicircular pattern to a flexible circuit board (as illustrated by an array 501 in FIG. 5A) or by creating facets which each include a group of emitters mounted to a rigid circuit board and arranging the facets in a semicircular pattern (as illustrated by an array 502 in FIG. 5B). For example, the array 501 includes individual emitters 504-508 (among other emitters) and the array 502 includes facets 510-514 (among other facets), where each facet includes three individual emitters. The individual emitters 504-508 may be each configured to emit electromagnetic radiation, for example toward a central point 518 of the array 501. Similarly, the facets 510-514 may be configured so that combined electromagnetic radiation of the facet's emitters is directed toward a central point 520 of the array 502.

Figure 6:
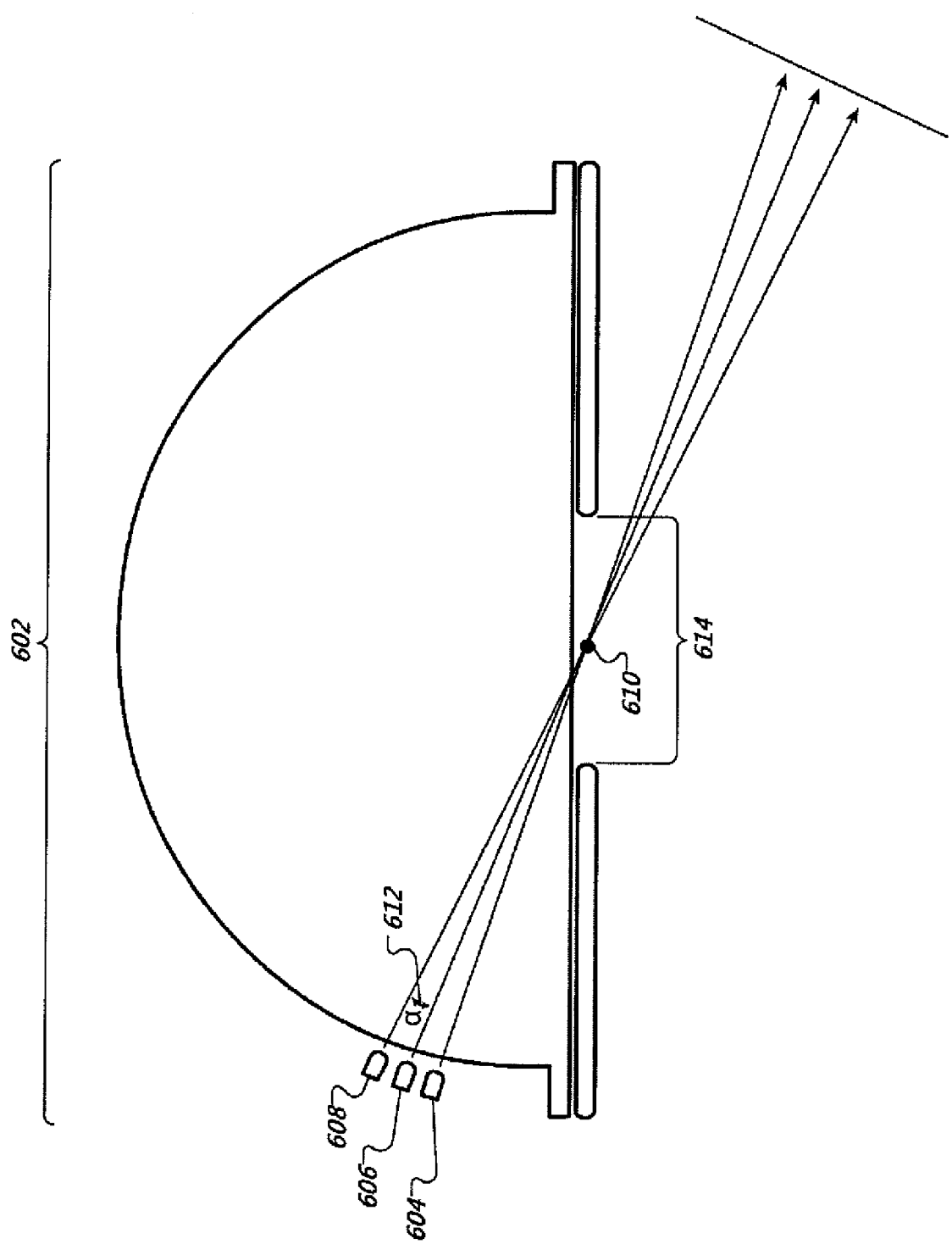

As shown in FIG. 6, emitter placement and spacing may be configured. A semicircular array of emitters 602 includes emitters 604-608 (among other emitters). The emitters 604-608 may be configured so that they each emit toward a central point 610 of the array 602. Emitters 604-608 may be positioned so that the angle between two adjacent emitters is less than or equal to an emitter's angle of half intensity. An angle of half intensity is an angle where the intensity of electromagnetic radiation is half that at a zero, or target position. In another configuration, a semicircular array of emitters may include facets configured so that each facet emits towards a central point of the array, and the angle between two adjacent facets is less than or equal to an emitter's angle of half intensity.

For example, the emitters 604-608 are placed such that an angle α 612 between emitters 606 and 608 is less than the emitters' 604-608 angle of half intensity (assuming that the emitters 604-608 each have the same intensity). For example, the angle α 612 may be six degrees, and the angle of half intensity of the emitters 604-608 may be seven degrees. As shown in FIG. 7, graphs 704-708 each illustrate the intensity of electromagnetic radiation emitting from the individual emitters 604-608, respectively. An angle β 710 corresponds to the angle α 612. The emitters 604-608 are placed such that the sum of the intensities of electromagnetic radiation from multiple emitters on a target point is uniform. That is, given the overlap of electromagnetic radiation between emitters, emitters can be configured such that the sum of the emitted electromagnetic radiation that lands on a target in any position is equal, which may provide even illumination over the projection area of a surface.

Positioning emitters 604-608 so that the angle between two adjacent emitters is less than the angle of half intensity results in a consistent intensity of light radiating from the array 602. Positioning the emitters 604-608 so that they each emit toward the central point 610 may allow for the front of the array 602 to be partially covered. For example, if the array 602 is inside of a housing, a gap 614 may be included in the front of the housing to allow electromagnetic radiation from the emitters 604-608 to emit outward, while the remainder of the front of the housing may be closed, or covered.

FIGS. 8A-8B illustrate coverage of a semicircular array of emitters 802. As shown in a top-down view in FIG. 8A, the semicircular array of emitters 802 may emit electromagnetic radiation in an area determined by an angle γ 804 which is close to 180 degrees (e.g., 170 degrees). For example, if the array 802 is housed inside of and emits electromagnetic radiation out of a device 806, the electromagnetic radiation may be emitted close to (e.g., nearly parallel to) the front side of the device 806.

In further detail and as shown in FIG. 8B, emitters 808-814 (along with other emitters) emit towards a central point 816. The emitters 808-814 are spaced less than or equal to an angle θ of half intensity apart from adjacent emitters. The bottom right emitter 814 is configured such that electromagnetic radiation emits through the central point 816 and generally towards the lower left emitter 808. Some of the electromagnetic radiation emitting from the bottom right emitter 814 passes the lower left emitter 808 and emits beyond the left corner of the device 806 (as indicated by dashed lines 818). Some of the electromagnetic radiation emitting from the bottom right emitter 814 may hit the lower left of the array 802 (e.g., at or below the lower left emitter 808), and may be reflected back rightward, as indicated by dashed lines 820. Similarly, some of the electromagnetic radiation emitting from the lower left emitter 808 may hit the lower right of the array 802 and may be reflected back leftward. The reflection of electromagnetic radiation coming from the bottom left emitter 808 and bottom right emitter 814 results in a wide area of electromagnetic radiation coverage collectively emitted from the array 802.

As shown in FIGS. 9A-9B, various approaches may be used to restrict electromagnetic radiation. As shown in FIG. 9A, plates 902 and 904 may be placed above and below an emitter 906 to vertically restrict the emitted electromagnetic radiation. The distance between the emitter 906 and the front opening between the plates 902 and 904 may be approximately the same for each emitter in an array of emitters, and the distance may be slightly less than the radius of the semicircle formed by the array. As shown in FIG. 9B, the front opening between the plates 904 and 906 may be covered except for a slot opening 908. The height of the slot opening 908, along with the distance between the plates 904 and 906, may be configured to control the angle of half intensity of electromagnetic radiation emitted out of the slot opening 908. Alternatively, asymmetric lenses may be placed in the optical path of each emitter, or may be built into each emitter.

Semicircular arrays of emitters may be stacked. For example, arrays may be stacked to avoid gaps in or inconsistency of electromagnetic radiation emission, such as in a very small device or if large facets are used. Each of the arrays in a stack may include facets that are spaced apart wider than the angle of half intensity, and the position of the facets may be arranged to be offset between each layer of the stack, such that the emitters of the second array fill in the gaps produced by the emitters of the first array, thereby producing uniform illumination where the angle between facets is larger than the angle of half intensity. Arrays may also be stacked if a brighter intensity of electromagnetic radiation is desired.

Figure 10:
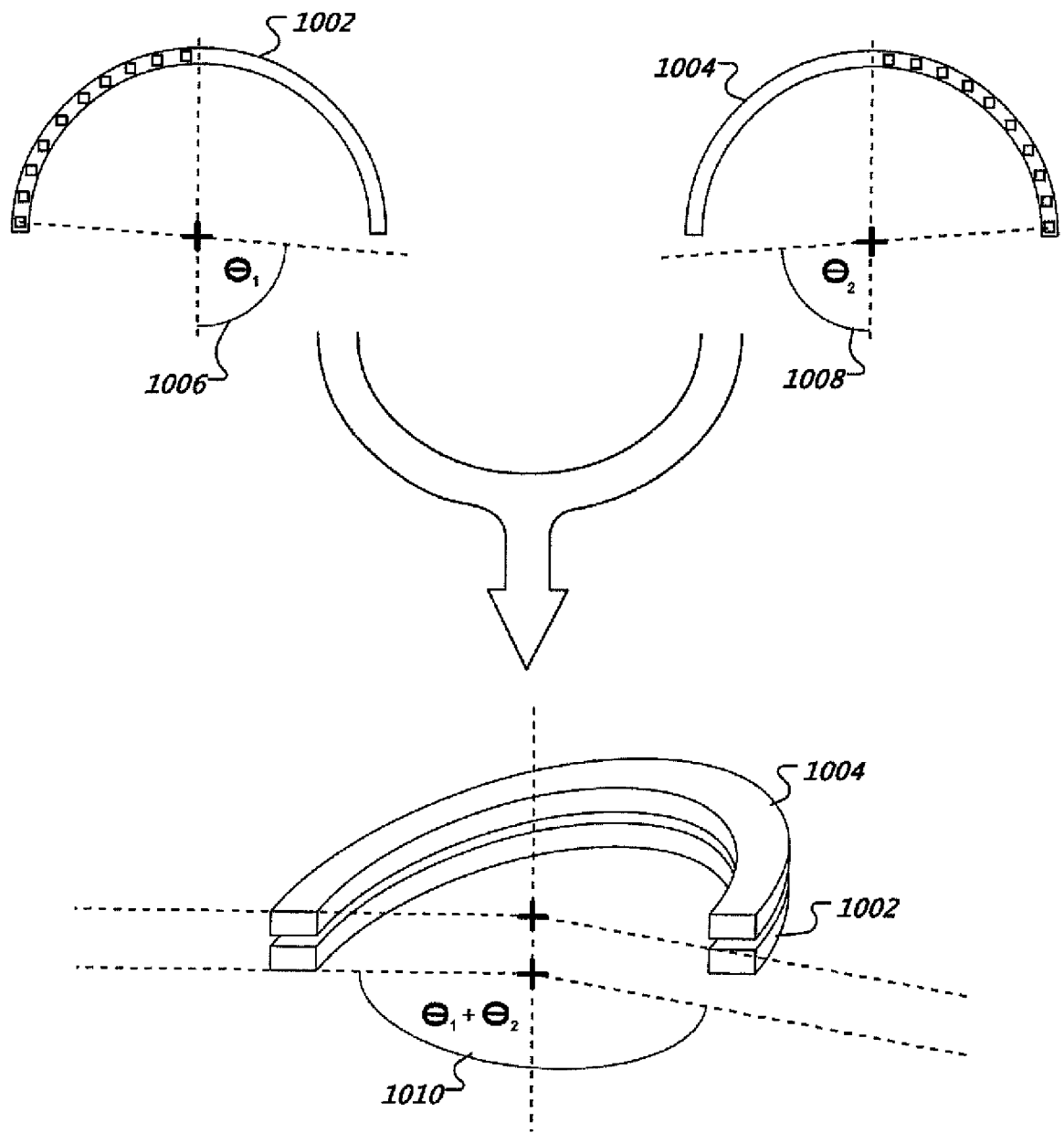
FIGS. 10-11 illustrate stacking emitter arrays.

In one example and as shown in FIG. 10, a semicircular array 1002 includes emitters on the left side of the array 1002 and a semicircular array 1004 includes emitters on the right side of the array 1004. The array 1002 may emit electromagnetic radiation over an area indicated by an angle $\theta_1$ 1006 and the array 1004 may emit electromagnetic radiation over an area indicated by an angle $\theta_2$ 1008. The emitters 1002 and 1004 may be stacked (e.g., with the array 1004 on top of the array 1002). The combined arrays 1002 and 1004 may emit electromagnetic radiation over an area indicated by an angle 1010 having an angle of $(\theta_1+\theta_2)$.

Figure 11A:
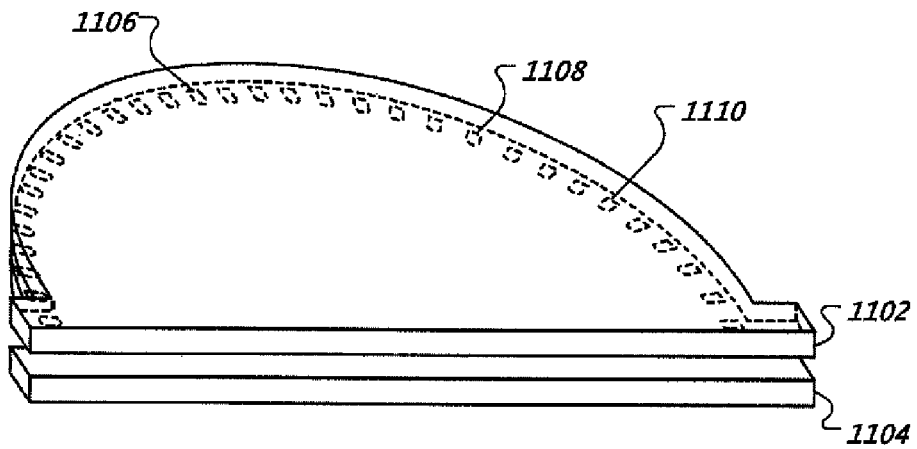

FIG. 11A illustrates plates 1102 and 1104 positioned such that a gap exists between the two plates. The plates 1102 and 1104 may be of the same size and shape. Emitters 1106-1110 (along with various other emitters forming a semicircular array of emitters) are placed in the gap between the plates 1102 and 1104. The diameter of the plates 1102 and 1104 and the distance between the plates 1102 and 1104 may be configured to control vertical emission from the emitters 1106-1110.

Figure 11B:
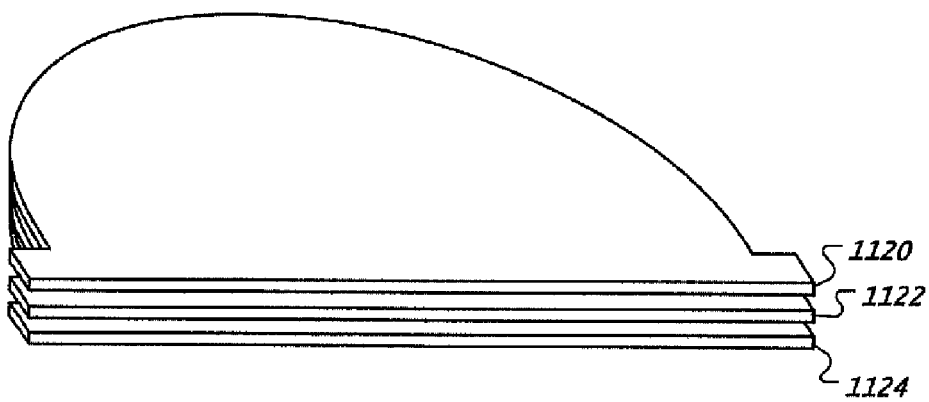
Figure 11C:
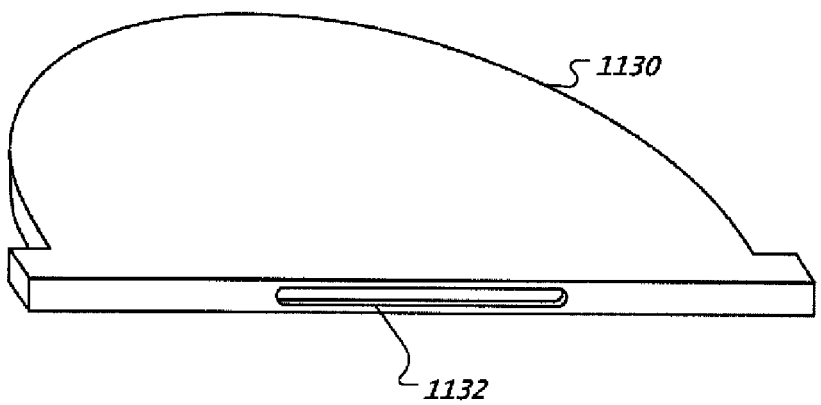

As shown in FIG. 11B, multiple layers of plates may be stacked to increase the amount of electromagnetic radiation emitted. Three plates 1120-1124 are stacked, with one set of emitters placed between plates 1120 and 1122 and a second set of emitters placed between plates 1122 and 1124. As shown in FIG. 11C, as a consequence of the placement of emitters in a semicircular pattern, the entire front face of a plate 1130 may not need to be open to allow the emission of electromagnetic radiation. A slot 1132 with a length that is a fraction of the width of the face of the plate 1130 may be sufficient to allow the emission of electromagnetic radiation from all of the emitters in a semicircular array.

Returning to FIG. 4, after electromagnetic radiation is emitted, electromagnetic radiation that reflects off of an object interrupting the defined layer is detected (S406), where the defined layer overlaps the region of the surface onto which the graphical user interface is projected. For example, a camera may detect the reflection of electromagnetic radiation off of a user's hand, foot or finger, or off of a pointing device such as a stylus. For example, if the graphical user interface is projected onto a floor, a user's foot may be detected. As another example, if the graphical user interface is projected onto a table, a user's finger or a stylus may be detected.

After reflection of electromagnetic radiation is detected, data indicating a position of the object is outputted (S408), thereby ending the process 400 (S410). For example, a processor may be configured to determine the position of the object with respect to the region of the surface onto which the graphical user interface is projected. The processor may control an application based on the determined position. For example, the determined position may be mapped to a mouse event and the mouse event may be provided to the application.

Thus, using this enhanced approach, a graphical user interface for an application may be projected onto a surface such as a floor or table. Electromagnetic radiation is emitted from a semicircular array of emitters in a layer parallel to the surface. Reflected electromagnetic radiation that reflects off of an object (e.g., the user's hand, finger or foot) is detected, and data indicating a position of the object is outputted. For example, an application may be controlled based on the detected position of the object.

Figure 12:
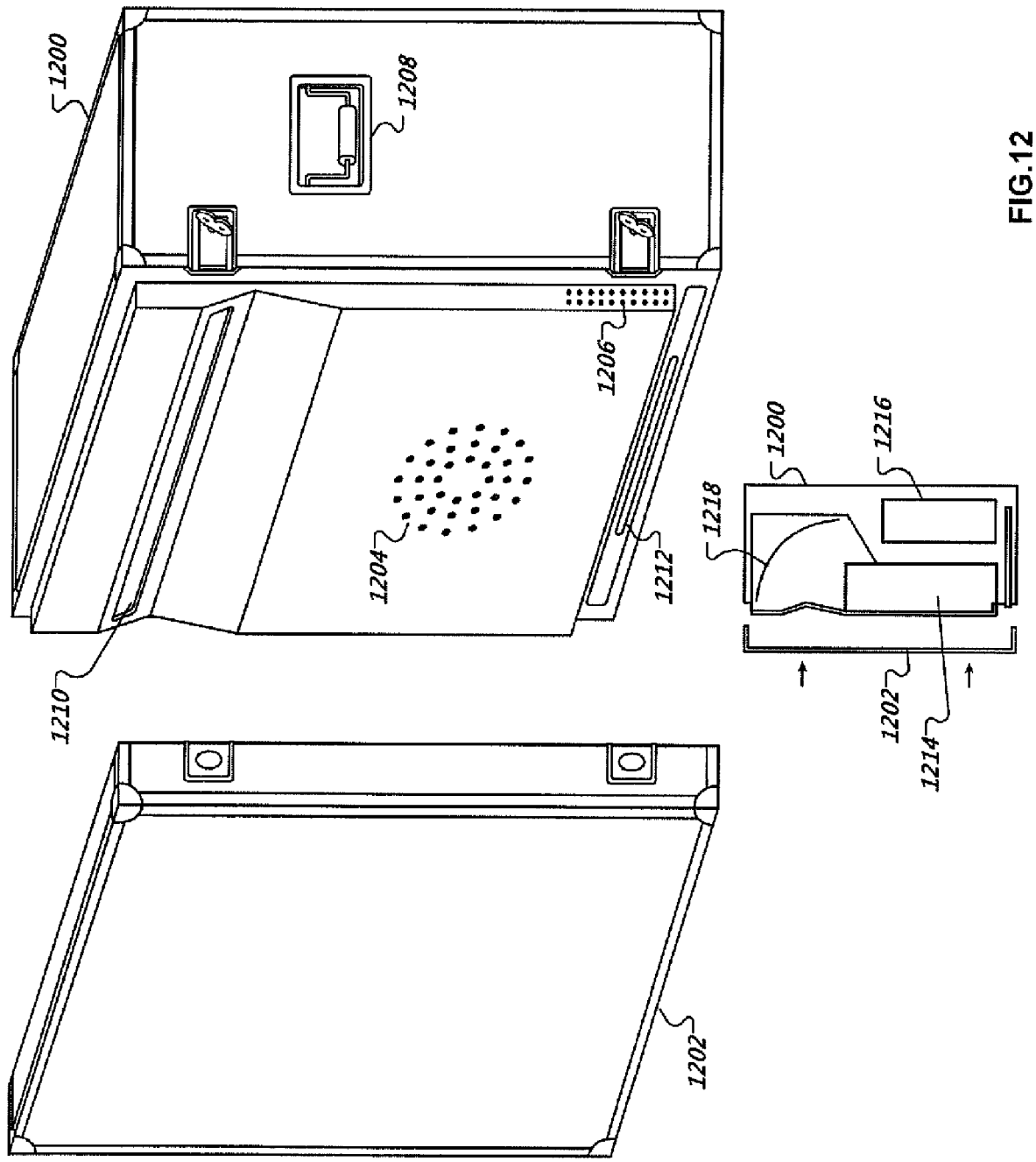
FIG. 12 illustrates an example portable device.

FIG. 12 illustrates an example device 1200. In some implementations, various components are built into the device 1200 and the device may be transported and ready to operate after being plugged into an electric outlet. The device 1200 includes a removable cover 1202, one or more speakers 1204, one or more air vents 1206, one or more handles 1208, one or more windows 1210, a slot 1212 for a semicircular array of emitters (emitters not shown), a projector 1214, a processor 1216, a mirror 1218, and a camera (not shown).

The handles 1208 allow the device 1200 to be carried to its destination and placed onto a surface (e.g., floor, table). The camera captures an image of the surface through a window 1210, and the projector projects an image which is reflected off of the mirror 1218, through a window 1210, and onto the surface. A single window may be used for both the camera and projector, or a separate window may be provided for each. The semicircular array of emitters emit electromagnetic radiation through the slot 1212. The semicircular array of emitters fits near the bottom of the device 1200 and may be in contact with the outer casing material of the device 1200.

Protruding parts of the device 1200 fit inside the cover 1202 when the cover 1202 is closed. The projector 1214 and processor 1216 may be mounted within high density foam and/or may be mounted with rubber shock mounts. The air vents 1206, handles 1208, and speakers 1204 may be placed as shown or in other positions. A second removable cover (not shown) may exist in the rear of the device 1200, exposing a power cord, additional air vents, computer ports, etc.

Figure 13:
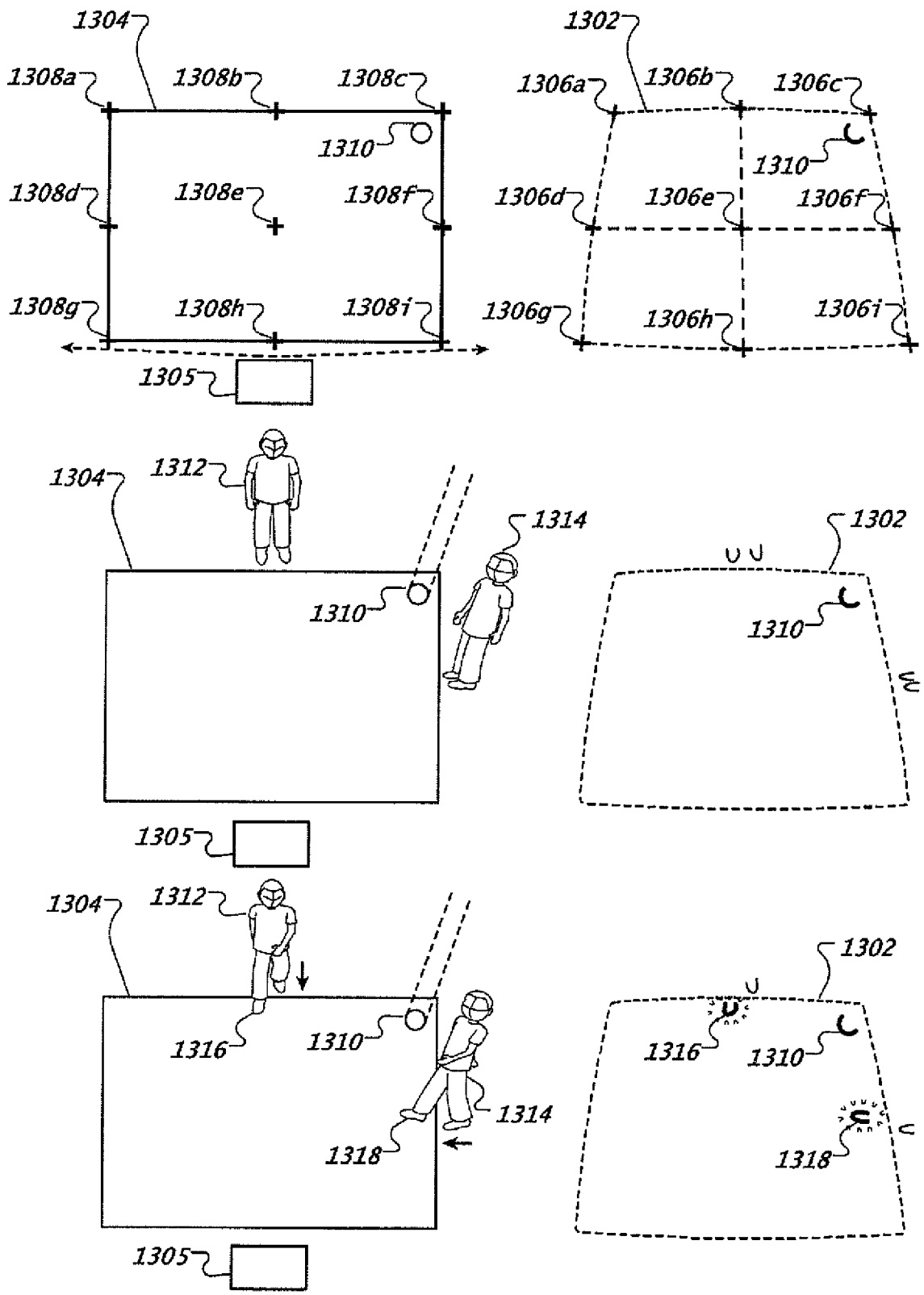
FIG. 13 illustrates device calibration.

A camera used to detect reflection of electromagnetic radiation may not be centered above the image, therefore the camera image may include keystone distortion. For example and as shown in FIG. 13, a camera image 1302 has a trapezoid shape whereby one side is narrower than the opposite side. A camera used to detect reflection of electromagnetic radiation may use a wide angle lens. The wide angle lens may cause additional distortion of the camera image. For example and as shown in FIG. 13, a camera image 1302 has curved edges, in contrast to a rectangular projected image 1304 projected by a device 1305, which has straight edges.

A calibration and/or transformation process may be performed by the user, manufacturer or retailer, to account for distortion. For example, tracking software running on a processor may operate on the distorted camera image. Parts of the camera image that are outside of a projected surface area may be masked out or otherwise ignored and the results of tracking may be undistorted by applying a coordinate transform which remaps coordinates between the camera image and projected image.

For example, camera image coordinates 1306*a-i* may be mapped to corresponding projected image coordinates 1308*a-i*, respectively. In some implementations, a camera image may be undistorted by "warping" or transforming the camera image and tracking software may then operate on the transformed camera image. A device may be pre-calibrated using a known coordinate transform (e.g., devices may be programmed with a common calibration that is representative of a typical unit). As another approach, each individual unit may be calibrated prior to shipping to the customer. An automatic calibration procedure may be used, such as a preformed pattern of blocks that represent points.

A calibration process may be used to identify objects that may be obscuring captured camera images. For example, a pole 1310 is captured in the camera image 1302. Objects such as the pole 1310 that are identified as obstructing objects during a calibration process may be ignored by subsequent detection processing. For example, users 1312 and 1314 are standing outside of the projected image 1304. In some implementations, the camera may detect the positions of the feet of the users 1312 and 1314 and a processor may determine the positions of the feet as being outside of the projected image 1304. In other implementations, the camera is configured to only detect objects that are over the projected image 1304 and the feet of the users 1312 and 1314 may be undetected. The pole 1310 which was identified as an obstructing object in a calibration process is ignored, despite being over the projected area 1304.

If the user 1312 steps with a right foot 1316 onto the projected image 1304 and the user 1314 steps with a right foot 1318 onto the projected image 1304, the camera may detect reflection of electromagnet radiation off of the foot 1316 and the foot 1318, and a processor may determine that the feet 1316-1318 are over the projected image 1304, and as a result an application may be controlled based upon the detected positions. As before, the poll 1310 is ignored.

In some examples, the detected positions of feet 1316-1318 may be mapped to a mouse event. In these examples, the detected positions of one or both of the feet 1316-1318 may map to a position of a mouse icon. For instance, as the user 1312 drags his or her right foot 1316 across the surface without lifting, a corresponding mouse icon moves in a manner corresponding to the movement of the foot. When the user 1312 lifts and presses down with his or her right foot 1316 on the surface (e.g., taps), the gesture may be detected and interpreted as a mouse click event. In other examples, a two tap motion of the foot may be interpreted as a double click, a tap with the right foot 1316 may be interpreted as a right click event, and a tap with a left foot may be interpreted as a left click event.

The device 1305 may be considered a "multi-touch" device, in that if both users 1312 and 1314 simultaneously step onto the projected image 1304, positions of both feet 1316 and 1318 may be detected, resulting in two determined positions, both of which may be provided (e.g., to an application) as separate inputs. As other examples, a user may touch a surface with both hands or with multiple fingers, and each body part or other object touching the surface may be separately detected, resulting in the mapping of multiple detected positions to multiple inputs.

Figure 14:
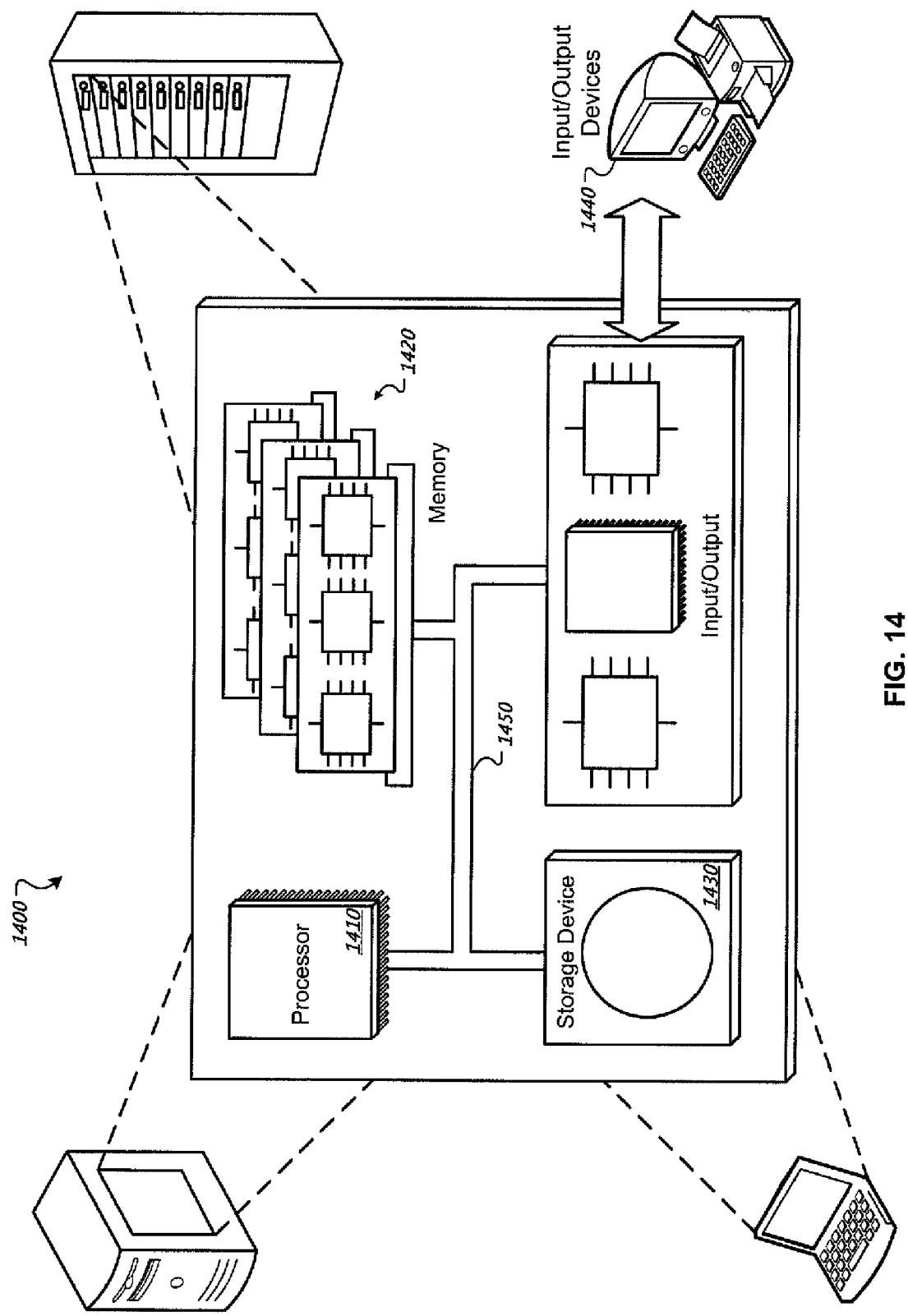
FIG. 14 illustrates an exemplary computing device.
Like reference numbers represent corresponding parts throughout.

FIG. 14 is a schematic diagram of a computing system 1400. The system 1400 can be used for the operations described in association with any of the computer-implemented methods described previously. The system 1400 includes a processor 1410, a memory 1420, a storage device 1430, and an input/output device 1440. Each of the components 1410, 1420, 1430, and 1440 are interconnected using a system bus 1450. The processor 1410 is capable of processing instructions for execution within the system 1400. In one implementation, the processor 1410 is a single-threaded processor. In another implementation, the processor 1410 is a multi-threaded processor. The processor 1410 is capable of processing instructions stored in the memory 1420 or on the storage device 1430 to display graphical information for a user interface on the input/output device 1440.

The memory 1420 stores information within the system 1400. In some implementations, the memory 1420 is a computer-readable storage medium. In another implementation, the memory 1420 is a volatile memory unit. In yet another implementation, the memory 1420 is a non-volatile memory unit.

The storage device 1430 is capable of providing mass storage for the system 1400. In some implementation, the storage device 1430 is a computer-readable storage medium. In various different implementations, the storage device 1430 may be a floppy disk device, a hard disk device, an optical disk device, or a tape device. The input/output device 1440 provides input/output operations for the system 1400. In one implementation, the input/output device 1440 includes a keyboard and/or pointing device. In another implementation, the input/output device 1440 includes a display unit for displaying graphical user interfaces.

Various implementations of the systems and techniques described here may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the systems and techniques described here), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the disclosure. Accordingly, other implementations are within the scope of the following claims.

What is claimed is:

1. A device comprising:
a projector configured to project a graphical user interface for an application onto a surface;
a semicircular array of emitters configured to emit electromagnetic radiation toward a central point of the array, the electromagnetic radiation collectively emitted by the array defining a layer aligned parallel with the surface and overlapping at least a region of the surface onto which the graphical user interface is projected, wherein a difference in angle between adjacent emitters of the array is less than or equal to a minimum angle of half intensity of each of the adjacent emitters;
a sensor configured to detect the electromagnetic radiation that reflects off of an object interrupting the defined layer where the defined layer overlaps the region of the surface onto which the graphical user interface is projected; and
an interface configured to output data indicating a position of the object.

2. The device of claim 1, wherein the projector comprises a short throw projector or an ultra short throw projector.

3. The device of claim 1, further comprising a housing, wherein the projector, the array, and the sensor are disposed within the housing.

4. The device of claim 1, wherein the projector is configured to project the graphical user interface onto the surface through the defined layer of electromagnetic radiation.

5. The device of claim 1, wherein the layer of electromagnetic radiation collectively emitted by the array fans out from a central point and has a thickness of less than 0.5 inches in a center of the region of the surface onto which the graphical user interface is projected, and has a thickness of less than 1 inch in any part of the region of the surface onto which the graphical user interface is projected.

6. The device of claim 1, further comprising:
a processor configured to perform a calibration process to identify one or more objects obstructing the defined layer at a position where the defined layer overlaps the region of the surface onto which the graphical user interface is projected and, subsequent to the calibration process, ignore the identified one or more objects in detection processing.

7. The device of claim 1, wherein the array of emitters further comprises a plate defining a slot, the slot limiting a vertical spread of the electromagnetic radiation collectively emitted by the array.

8. The device of claim 1, further comprising:
a processor configured to determine the position of the object with respect to the region of the surface onto which the graphical user interface is projected, based on the detected electromagnetic radiation, and to control the application based on the determined position.

9. The device of claim 8, wherein the position of the object is determined with respect to the region of the surface onto which the graphical user interface is projected based on applying a coordinate transform to the detected electromagnetic radiation.

10. The device of claim 8, wherein the processor is further configured to automatically calibrate the projector and the sensor.

11. The device of claim 8, wherein:
the sensor further comprises a wide-angle lens, and
the processor is further configured to correct a distortion associated with the wide-angle lens.

12. The device of claim 8 wherein the controlling the application based on the determined position further comprises mapping the determined position to a mouse event.

13. The device of claim 1, wherein the array is disposed between the projector and the surface.

14. The device of claim 1, wherein:
the region comprises a rectangular region measuring at least 60 inches diagonal, and
the array emits the electromagnetic radiation at a horizontal angle of 170° or greater, and a vertical angle of 1° or less.

15. The device of claim 1, further comprising:
a processor configured to determine the position of the object based on the detected electromagnetic radiation, compare the determined position of the object with the region of the surface onto which the graphical user interface is projected, determine whether the determined position of the object is within the region of the surface onto which the graphical user interface is projected based on the comparison, and, in response to a determination that the determined position of the object is outside of the region of the surface onto which the graphical user interface is projected, ignore the object in controlling the application.

16. The device of claim 1, wherein in the application is at least one of a medical therapy application and an application to entertain pets.

17. A computer-implemented method comprising:
projecting a graphical user interface for an application onto a surface;
emitting electromagnetic radiation, the electromagnetic radiation collectively emitted by a semicircular array of emitters defining a layer aligned parallel with the surface and overlapping at least a region of the surface onto which the graphical user interface is projected, wherein:
the semicircular array of emitters is configured to emit electromagnetic radiation toward a central point of the semicircular array; and
a difference in angle between adjacent emitters of the array is less than or equal to a minimum angle of half intensity of each of the adjacent emitters;
detecting the electromagnetic radiation that reflects off of an object interrupting the defined layer where the defined layer overlaps the region of the surface onto which the graphical user interface is projected; and
outputting, using at least one processor, data indicating a position of the object.

18. The computer-implemented method of claim 17, further comprising:
determining the position of the object with respect to the region of the surface onto which the graphical user interface is projected, based on the detected electromagnetic radiation; and
controlling the application based on the determined position.

19. The computer-implemented method of claim 18, further comprising:
applying a coordinate transform to the detected electromagnetic radiation.

20. A computer-readable storage medium encoded with a computer program comprising instructions that, when executed, operate to cause one or more computers to perform operations comprising:
projecting a graphical user interface for an application onto a surface;
emitting electromagnetic radiation, the electromagnetic radiation collectively emitted by a semicircular array of emitters defining a layer aligned parallel with the surface and overlapping at least a region of the surface onto which the graphical user interface is projected, wherein:
the semicircular array is configured to emit electromagnetic radiation toward a central point of the array; and
a difference in angle between adjacent emitters of the array is less than or equal to a minimum angle of half intensity of each of the adjacent emitters;
detecting the electromagnetic radiation that reflects off of an object interrupting the defined layer where the defined layer overlaps the region of the surface onto which the graphical user interface is projected; and
outputting data indicating a position of the object.

21. A device comprising:
means for projecting a graphical user interface for an application onto a surface;
a semicircular array of means for emitting electromagnetic radiation toward a central point of the array, the electromagnetic radiation collectively emitted by the array defining a layer aligned parallel with the surface and overlapping at least a region of the surface onto which the graphical user interface is projected, wherein
a difference in angle between adjacent emitters of the array is less than or equal to a minimum angle of half intensity of each of the adjacent emitters;
means for detecting the electromagnetic radiation that reflects off of an object interrupting the defined layer where the defined layer overlaps the region of the surface onto which the graphical user interface is projected; and
means for outputting data indicating a position of the object.

22. The device of claim 1, wherein the array comprises more than three emitters.

23. The device of claim 1, wherein each of the emitters is configured to emit electromagnetic radiation toward the central point.

24. The device of claim 1, wherein the array comprises a plurality of facets, each facet comprising a group of emitters.

25. The device of claim 24, wherein each of the facets is configured such that combined electromagnetic radiation of the facet's emitters is directed toward the central point.

26. The device of claim 1, wherein the central point is ahead, behind, above, below, left, or right of an actual or exact center of the array.

\* \* \* \* \*